US006452585B1

(12) United States Patent
Horton et al.

(10) Patent No.: US 6,452,585 B1
(45) Date of Patent: *Sep. 17, 2002

(54) RADIO FREQUENCY TRACKING SYSTEM

(75) Inventors: Robert Horton, Bakersfield; Jean-Jacques Grimaud, Portola Valley; Daniel Maddy, Cupertino; Michael Teitel, Portola Valley, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 09/621,932

(22) Filed: Jul. 24, 2000

Related U.S. Application Data

(63) Continuation of application No. 08/354,018, filed on Dec. 5, 1994, now Pat. No. 6,094,188, which is a continuation of application No. 08/155,359, filed on Oct. 6, 1993, now abandoned, which is a continuation of application No. 07/863,312, filed on Mar. 20, 1992, now abandoned, which is a continuation of application No. 07/621,447, filed on Nov. 30, 1990, now abandoned.

(51) Int. Cl.[7] .................................................. G09G 5/08
(52) U.S. Cl. ........................ 345/158; 345/156; 345/157; 434/45; 340/706; 340/709
(58) Field of Search ................................ 345/157, 158, 345/156; 434/45; 340/709, 706

(56) References Cited

U.S. PATENT DOCUMENTS 4,303,910 A    12/1981    McCann

| 4,352,098 A | | 9/1982 | Stephen et al. |
| 4,654,648 A | * | 3/1987 | Herrington ................... 340/710 |
| 4,688,037 A | | 8/1987 | Krieg |
| 4,988,981 A | * | 1/1991 | Zimmerman et al. ........ 340/709 |
| 5,021,765 A | | 6/1991 | Morgan |
| 6,094,188 A | * | 7/2000 | Horton et al. ............... 345/158 |
| 6,222,523 B1 | * | 4/2001 | Harvill et al. ............... 345/156 |

FOREIGN PATENT DOCUMENTS

| EP | 0 312 481 | 4/1989 |
| JP | 59-117631 | 7/1984 |
| JP | 62-008009 | 1/1987 |

* cited by examiner

Primary Examiner—Richard Hjerpe
Assistant Examiner—Jennifer T. Nguyen
(74) Attorney, Agent, or Firm—Conley, Rose & Tayon, PC; B. Noël Kivlin

(57) ABSTRACT

A method and apparatus is disclosed for transmitting data about an object within a defined field and using the transmitted data to generate a virtual object on the display screen of a computer. In one embodiment of the present invention the object used to transmit input data is a wireless glove assembly. The glove assembly supports a transmitting device which transmits data bursts, containing position and gesture information, in the radio frequency wavelength to four stationary receivers. The received signal is converted to a digital signal and input to a microprocessor control unit. The software used in the microprocessor control unit uses an averaging method to generate a virtual object on the computer display screen. The position of the virtual object is calculated based on the strength of the signal received. The movement of the virtual object on the computer display screen is in the same direction as and is proportional to the glove movement.

20 Claims, 14 Drawing Sheets

DIGITAL TRANSMITTER

DIGITAL RECEIVER

INTERFACE MODULE

INTERFACE MODULE

```
                              Page 1
1  ***********************************
2  * VERSION 5.50                    *
3  * THREE DIMENSIONAL POSITIONING   *
4  * AND GESTURE RECOGNITION CODE    *
5  * FOR THE COMMODORE 64/128        *
6  * (C) COPYRIGHT 1987              *
7  * BY ROBERT D HORTON              *
8  * LAST UPDATE 5/14/87             *
9  ***********************************
10
11            ORG     $9B00
12
13 ***********************************
14 * THIS ROUTINE MAY BE ASSEMBLED   *
15 * ANYWHERE,BUT IF YOU CHANGE      *
16 * VIC CHIP VIDEO LOCATIONS YOU    *
17 * WILL HAVE TO CHANGE THE SPRITE  *
18 * DATA POINTER,THE SPRITE DATA    *
19 * LOCATION TABLE,AND OF COURSE    *
20 * MOVE ALL THE SPRITE DATA        *
21 ***********************************
21
22
23 *   JUMP TABLE
24
25            JMP     CONNECT        ;ENGAGE HARDWARE
26            JMP     DCONNECT       ;DISENGAGE HARDWARE
27
28 *   USER SOFTWARE INFORMATION LOCATIONS
29
30 OLDGEST    HEX     FF             ;READ HERE FOR THE CURRENT GESTURE
31 ZAXIS      HEX     00             ;READ HERE FOR THE CURRENT Z AXIS VALUE
32
33 *   NOTE:IF YOU WISH TO KNOW THE ACTUAL
34 *   SPRITE X AND Y LOCATIONS YOU MUST
35 *   READ THE SPRITE POSITION REGISTERS
36 *   BUT BE AWARE THAT THE SPRITES ARE
37 *   OFFSET 11 BITS TO THE LEFT AND 10 BITS
38 *   UP TO ALIGN THE IMAGES WITH THE CENTER
39 *   OF THE SCREEN
40
41 *   ACTIVATE GLOVE
42
43 CONNECT SEI                       ;SET NEW INTERRUPT VECTOR
44            LDA     CINVLO
45            STA     OLDINVLO
46            LDA     CINVHI
47            STA     OLDINVHI
48            LDA     #<IRQMAIN
49            STA     CINVLO
50            LDA     #>IRQMAIN
51            STA     CINVHI
52            LDA     NMILO          ;SET NEW NMI VECTOR
53            STA     OLDNMILO
54            LDA     NMIHI
55            STA     OLDNMIHI
56            LDA     #<NMIMAIN
57            STA     NMILO
58            LDA     #>NMIMAIN
59            STA     NMIHI
```

CODE LISTING

FIG. 5A

```
                              Page 2
60              LDA    #$01
61              STA    INTFLAG    ;RESET IRQ SOFTWARE FLAG
62              STA    IRQFLAG    ;RESET HARDWARE IRG FLIP-FLOP
63              ORA    SPENA      ;TURN ON SPRITE NUMBER 0
64              STA    SPENA
65              CLI
66              RTS
67
68 *   INTERRUPT ROUTINE
69
70 *   NOTE :IF YOU ARE USING OTHER INTERRUPTS
71 *   THIS COD E SHOULD BE EXECUTED FIRST
72 *     DUE TO CRITICAL TIMING REQUIREMENTS
73
74 IRQMAIN     LDA    INTFLAG    ;ALREADY PROCESSING A GLOVE IRQ?
75             BEG    IRQOUT
76             LDA    IRQFLAG    ;GLOVE IRQ?
77             AND    #$01
78             BEQ    IRQOUT
79             LDA    #$00       ;SET UP TO PROCESS GLOVE'S IRQ
80             STA    COUNT
81             STA    GESTURE
82             STA    INTFLAG
83             LDX    #$05       ;HI BYTE FOR TIMER
84             LDY    #$00       ;LO BYTE FOR TIMER
85             JSR    SETIMER    ;SET TIMER TO DELAY INTO RECIEVED SIGNAL
86             PLA               ;IRQ RETURN ROUTINE-RESTORE 6510 REGISTERS
87             TAY
88             PLA
89             TAX
90             PLA
91             RTI
92
93 IRQOUT      JMP    (OLDINVLO )  ;DO SYSTEM IRQ ROUTINE
94
95 *   NON -MASKABLE INTERRUPT ROUTINE
96
97 *   NOTE :IF YOU ARE USING OTHER NMI'S
98 *     YOU WILL HAVE TO MODIFY THIS ROUTINE
99 *     BUT YOU MUST EXECUTE THIS CODE FIRST
100 *     DUE TO CRITICAL TIMING REQUIREMENTS
101
102 NMIMAIN    PHA               ;SAVE 6510 REGISTERS
103            TXA
104            PHA
105            TYA
106            PHA
107            LDA    C12ICR
108            BEQ    NMIOUT     ;IF NOT CIA2 NMI GET OUT
109            AND    #$01
110            BEQ    NMIOUT     ;IF NOT TIMER A FLAG GET OUT
111            LDA    COUNT
112            BNE    NMIMAIN2   ;IF NOT 0 READ RECEIVERS FOR FINGER DATA
113            LDX    #$05       ;TIMER HI BYTE
114            LDY    #$30       ;TIMER LO BYTE
115            JSR    SETIMER    ;SET TIMER TO GET FINGERS NEXT
116            LDY    #$03
```

FIG. 5B

Page 3

```
117 NMIMAIN1  JSR      GETIT       ;READ A/D CHANNEL
118            CLC                  ;AVERAGE WITH LAST RF VALUE
119            ADC      RECVO,Y
120            ROR
121            STA      RECVO,Y     (GET POSITIONAL DATA)
122            DEY
123            BPL      NMIMAIN1
124            INC      COUNT
125            CMP      NMIOUT
126 NMIMAIN2  CMP      #$06        ;CHECK IF LAST FINGER HAS BEEN DONE
127            BEQ      CHKREC
128            LDX      #$04        ;HI BYTE FOR TIMER
129            LDY      #$80        ;LO BYTE FOR TIMER
130            JSR      SETIMER     ;SET TIMER FOR NEXT FINGER
131            LDY      #$04        ;SELECT A/D CHANNEL #4
132            JSR      GETIT       ;GET FINGER DATA FROM A/D CONVERTOR
133            CMP      #$85        ;COMPARE TO RECIEVE LIMIT
134            BCS      NMIMAIN4    ;FINGER WAS OPEN
135            LDX      COUNT       ;MAKE A BIT FOR A CLOSED FINGER
136            LDA      #$00
137            SEC
138 NMIMAIN3  ROL
139            DEX
140            BNE      NMIMAIN3
141            ORA      GESTURE
142            STA      GESTURE     ;STORE NEW BIT IN GESTURE VARIABLE
143 NMIMAIN4  INC      COUNT
144 NMIOUT    PLA                   ;NMI RETURN ROUTINE-RESTORE 6510 REGISTERS
145            TAY
146            PLA
147            TAX
148            PLA
149            RTI
150
151 * CHECK THAT ALL RECEIVERS HAVE A SIGNAL GREATER THAN $07
152 * AND SAVE THE GREATEST RECEIVER RF VALUE
153
154 CHKREC    LDY      #$03
155            STY      HIREC       ;INITIALIZE HIREC VALUE
156 CHKRECI   LDA      RECVO,Y
157            CMP      #$07
158            BCS      CHKREC2
159            JMP      DOGEST2     ;END ROUTINE IF ANY RECEIVER BELOW CLIP
160 CHKREC2   CMP      HIREC
161            BCC      CHKREC3
162            STA      HIREC       ;SAVE GREATEST RECEIVER RF VALUE
163 CHKREC3   DEY
164            BPL      CHKRECI
165
166 * CALCULATE Z AXIS BY AVERAGING ALL RECEIVERS
167
168            CLC                  ;AVERAGE 2 RECEIVERS
169            LDA      RECVO
170            ADC      RECVI
171            ROR
172            STA      REG1
173            CLC                  ;AVERAGE THE OTHER 2 RECEIVERS
```

FIG. 5C

Page 4

```
174              LDA    RECV2
175              ADC    RECV3
176              ROR
177              STA    REG2
178              CLC                  ;AVERAGE BOTH AVERAGES
179              ADC    REG1
180              ROR
181              STA    REG3
182              SEC                  ;COMPUTE Z AXIS VALUE
183              LDA    #$B0          ;Z AXIS SCALING VALUE
184              SBC    REG3
185              BCS    ZOK
186              JMP    DOGEST2       ;GLOVE TO CLOSE TO RECEIVERS,END ROUTINE
187   ZOK        CLC                  ;AVERAGE WITH LAST Z AXIS VALUE
188              ADC    ZAXIS
189              ROR
190              STA    ZAXIS
191
192   * OPTIMIZE ALL RECEIVER READINGS
193
194   * FORMULA=((RECV(0-3)*(SCALING VALUE))/HIREC)
195
196              LDX    #$03
197   OPTIMIZE   JSR    CLEAR         ;CLEAR MATH REGISTERS
198              LDA    RECV0,X       ;GET RECEIVER RF VALUES
199              STA    REG1
200              LDA    #$FF          ;OVERALL SCALING VALUE
201              STA    REG2
202              JSR    MULTIPLY
203              LDA    #$00
204              JSR    CLEAR1
205              LDA    HIREC
206              STA    REG2
207              JSR    DIVIDE
208              LDA    REG1
209              STA    RECV0,X       ;PUT BACK OPTIMIZED RECEIVER RF VALUES
210              DEX
211              BPL    OPTIMIZE
212
213   * CALCULATE X POSITION
214
215   * RIGHT=((RECV2+RECV3)/2)
216   * LEFT=((RECV0+RECV1)/2)
217   * X POSITION=CENTER+RIGHT
218   * OR
219   * X POSITION=CENTER-LEFT
220
221              CLC                  ;ADD RECV0 AND RECV1 THEN DIVIDE BY 2
222              LDA    RECV0
223              ADC    RECV1
224              ROR
225              STA    REG1          ;REG1 HOLDS LEFT VALUE
226              CLC                  ;ADD RECV2 AND RECV3 THEN DIVIDE BY 2
227              LDA    RECV2
228              ADC    RECV3
229              ROR
230              STA    REG2          ;REG2 HOLDS RIGHT VALUE
```

FIG. 5D

Page 5

```
231              CMP      REG1         ;WHICH IS GREATER RIGHT OR LEFT?
232              BCC      GOLEFT
233              SEC                   ;GET DIFFERENCE OF RIGHT MINUS LEFT
234              SBC      REG1
235              CLC                   ;ADD TO CENTER OF SCREEN TO GO RIGHT
236              ADC      #$AD
237              BCC      RESMISG
238              CMP      #$4C         ;IF GREATER THAN 255 COMPARE TO RIGHT CLIP
239              BCC      SETMISG
240              LDA      #$4C
241              JMP      SETMISG
242 GOLEFT       SEC                   ;GET DIFFERENCE OF LEFT MINUS RIGHT
243              LDA      REG1
244              SBC      REG2
245              STA      REG3
246              SEC                   ;SUBTRACT FROM CENTER OF SCREEN TO GO LEFT
247              LDA      #$AD
248              SBC      REG3
249              BCC      GOLEFT1
250              CMP      #$0D         ;CHECK IF GREATER THAN LEFT CLIP
251              BCS      RESMISG
252 GOLEFT1      LDA      #$0D
253 RESMISG      STA      SPOX         ;RESET MOST SIGNIFICANT X BIT OF SPRITE 0
254              LDA      MSIGX
255              AND      #$FE
256              STA      MSIGX

257              JMP      CALCY
258 SETMISG      STA      SPOX         ;SET MOST SIGNIFICANT X BIT OF SPRITE 0
259              LDA      MSIGX
260              ORA      #$01
261              STA      MSIGX
262
263 * CALCULATE Y   POSITION
264
265 * DOWN=((RECV0+RECV3)/2)
266 * UP=((RECV1+RECV2)/2)
267 * Y POSITION=CENTER-UP
268 * OR
269 * Y POSITION=CENTER+DOWN
270
271 CALCY        CLC                   ;ADD RECV1 AND RECV2 THEN DIVIDE BY 2
272              LDA      RECV1
273              ADC      RECV2
274              ROR
275              STA      REG1         ;REG1 HOLDS UP VALUE
276              CLC                   ;ADD RECV0 AND RECV3 THEN DIVIDE BY 2
277              LDA      RECV0
278              ADC      RECV3
279              ROR
280              STA      REG2         ;REG2 HOLDS DOWN VALUE
281              CMP      REG1         ;WHICH IS GREATER DOWN OR UP?
282              BCC      GOUP
283              SEC                   ;GET THE DIFFERENCE OF DOWN MINUS UP
284              SBC      REG1
285              CLC                   ;ADD TO CENTER OF SCREEN TO GO DOWN
286              ADC      #$8C
287              BCS      GODOWN
```

FIG. 5E

Page 6

```
288              CMP      #$EF        ;CHECK IF LESS THAN DOWN CLIP
289              BCC      GODOWN1
290 GODOWN       LDA      #$EF
291 GODOWN1      STA      SPOY
292              JMP      DOGEST
293 GOUP         SEC                  ;GET THE DIFFERENCE OF UP MINUS DOWN
294              LDA      REG1
295              SBC      REG2
296              STA      REG3
297              SEC                  ;SUBTRACT FROM CENTER OF SCREEN TO GO UP
298              LDA      #$8C
299              SBC      REG3
300              BCC      GOUP1
301              CMP      #$28        ;CHECK IF GREATER THAN UP CLIP
302              BCS      GOUP2
303 GOUP1        LDA      #$28
304 GOUP2        STA      SPOY
305
306 * GESTURE RECOGNITION ROUTINE
307
308 DOGEST       LDA      GESTURE
309              CMP      OLDGEST
310              BEG      DOGEST4
311              LDY      #$06        ;CURRENT NUMBER OF GESTURES MINUS 1
312 DOGEST1      CMP      GTABLE,Y    ;SEE IF NEW GESTURE MATCHES ONE IN THE TABLE
313              BEQ      DOGEST3
314              DEY
315              BPL      DOGEST1
316 DOGEST2      LDA      #$00        ;IF GESTURE UNRECOGNIZED MAKE IT AN OPEN HAND
317              TAY
318 DOGEST3      STA      OLDGEST
319              LDA      STABLE,Y    ;GET SPRITE LOCATION DATA
320              STA      SPRLOC
321 DOGEST4      LDA      #$01
322              STA      INTFLAG     ;RESET SOFTWARE IRQ FLAG
323              STA      IRQFLAG     ;RESET HARDWARE IRQ FLIP FLOP
324              JMP      NMIOUT      ;LAST THING DONE IN THE ENTIRE ROUTINE
325
326 * MATH ROUTINES
327
328 MULTIPLY LDA          #$00         ;16 BIT MULTIPLICATION ROUTINE
329              STA      REG3+1
330              LDY      #$11
331 MLOOP        LSR      REG3+1
332              ROR
333              ROR      REG1+1
334              ROR      REG1
335              BCC      MLOOP1
336              CLC
337              ADC      REG2
338              PHA
337              ADC      REG2
338              PHA
339              LDA      REG2+1
340              ADC      REG3+1
341              STA      REG3+1
342              PLA
343 MLOOP1       DEY
344              BNE      MLOOP
```

FIG. 5F

Page 7

```
345            STA     REG3
346            RTS
347
348 DIVIDE     LDA     #$00        ;16 BIT DIVISION ROUTINE
349            STA     REG3+1
350            LDY     #$10
351 DLOOP      ASL     REG1
352            ROL     REG1+1
353            ROL
354            ROL     REG3+1
355            PHA
356            CMP     REG2
357            LDA     REG3+1
358            SBC     REG2+1
359            BCC     DLOOP1
360            STA     REG3+1
361            PLA
362            SBC     REG2
363            PHA
364            INC     REG1
365 DLOOP1     PLA
366            DEY
367            BNE     DLOOP
368            STA     REG3
369            RTS
370
371 CLEAR      LDA     #$00        ;CLEAR ALL MATH REGISTERS
372            STA     REG1
373            STA     REG1+1
374 CLEAR1     STA     REG2        ;CLEAR REG2 AND REG3 ONLY
375            STA     REG2+1
376            STA     REG3
377            STA     REG3+1
378            RTS
379
380 * GET DATA FROM A/D CONVERTOR
381
382 GETIT      STA     AD,Y        ;SELECT A/D CHANNEL
383            LDX     #$0B
384 WAIT       NOP                 ;WAIT APPROXIMATELY 100US
385            DEX
386            BPL     WAIT
387            LDA     AD          ;GET A/D VALUE
388            RTS
389
390 *SET CIA2 TIMER A
391
392 SETIMER    STY     T12AL0      ;SET NMI TIMER COUNT VALUES
393            STX     T12AHI
394            LDA     #$81        ;ENABLE TIMER A INTERRUPT
395            STA     CI2ICR
396            LDA     #$19        ;FORCE LOAD,ONE SHOT MODE,START TIMER A
397            STA     CI2CRA
398            RTS
399
400 * DEACTIVATE GLOVE
401
```

FIG. 5G

Page 8

```
402 DCONNECT  SEI
403            LDA     OLDINVLO  RESTORE OLD IRQ VECTOR
404            STA     CINVLO
405            LDA     OLDINVHI
406            STA     CINVHI
407            LDA     OLDNMILO  RESTORE OLD NMI VECTOR
408            STA     NMILO
409            LDA     OLDNMIHI
410            STA     NMIHI
411            LDA     SPENA     ;TURN OFF SPRITE NUMBER 0
412            AND     #$FE
413            STA     SPENA
414            CLI
415            RTS
416
417 * ROUTINE STORAGE AND TABLE LOCATIONS
418
419 INTFLAG    HEX     00       ;INTERRUPT IN-PROCESSING SOFTWARE FLAG
420 COUNT      HEX     00       ;COUNT FOR READ RECEIVERS OR WHICH FINGER
421 GESTURE    HEX     00       ;NEW GESTURE BEING MADE
422 RECV0      HEX     00       ;RECV0 THRU RECV3 ARE RECEIVER RF VALUES
423 RECV1      HEX     00
424 RECV2      HEX     00
425 RECV3      HEX     00
426 GTABLE     HEX     00       ;OPEN HAND
427            HEX     01       ;SALUTE
428            HEX     03       ;OK
429            HEX     19       ;2 FINGER POINT
430            HEX     1D       ;1 FINGER POINT
431            HEX     1E       ;THUMBS DOWN
432            HEX     1F       ;CLOSED FIST
433 STABLE     HEX     28       ;SPRITE DATA LOCATION TABLE
434            HEX     29
435            HEX     2A
436            HEX     2B
437            HEX     2C
439            HEX     2D
439            HEX     2E
440 HIREC      HEX     00       ;GREATEST RECEIVER RF VALUE
441 REG1       HEX     00       ;REG1-REG3 ARE CALCULATION WORKING LOCATIONS
442            HEX     00
443 REG2       HEX     00
444            HEX     00
445 REG3       HEX     00
446            HEX     00
447 OLDINVLO   HEX     00       ;OLD INTERRUPT VECTOR
448 OLDINVHI   HEX     00
449 OLDNMILO   HEX     00       ;OLD NMI VECTOR
450 OLDNMIHI   HEX     00
451
452 * SYSTEM VECTOR AND REGISTER LOCATIONS
453
454 CINVLO     =       $0314    ;SYSTEM IRQ VECTOR LOCATIONS
455 CINVHI     =       $0315
456 NMILO      =       $0318    ;SYSTEM NMI VECTOR LOCATIONS
457 NMIHI      =       $0319
458 SPRLOC     =       $07F8    ;SPRITE DATA POINTER LOCATION
```

FIG. 5H

Page 9

```
459 SPOX     =    $D000   ;SPRITE 0 LEAST SIGNIFICANT X POSTION BYTE
460 SPOY     =    $D001   ;SPRITE 0 Y POSITION BYTE
461 MSIGX    =    $D010   ;MOST SIGNIFICANT X BITS OF ALL SPRITES
462 SPENA    =    $D015   ;SPRITE ENABLE REGISTER
463 T12ALO   =    $DD04   ;CIA2 TIMER A LO BYTE
464 T12AHI   =    $DD05   ;CIA2 TIMER A HI BYTE
465 C12ICR   =    $DD0D   ;CIA2 INTERRUPT CONTROL REGISTER
466 CI2CRA   =    $DD0E   ;CIA2 CONTROL REGISTER
467
468 * EXTERNAL HARDWARE LOCATIONS
469
470 AD       =    $DE00   ;BASE ADDRESS OF A/D CONVERTOR
471 IRQFLAG  =    $DF00   ;ADDRESS OF HARDWARE IRQ FLIP FLOP
```

FIG. 5I

RADIO FREQUENCY TRACKING SYSTEM

This application is a continuation of U.S. patent application Ser. No. 08/354,018, entitled "Radio Frequency Tracking System", filed Dec. 5, 1994, now U.S. Pat. No. 6,094,188 which is a continuation of U.S. patent application Ser. No. 08/155,359, filed Oct. 6, 1993, now abandoned, which is a continuation of U.S. patent application Ser. No. 07/863,312, filed Mar. 20, 1992, now abandoned, which is a continuation of U.S. application Ser. No. 07/621,447, filed Nov. 30, 1990, now abandoned.

BACKGROUND OF THE INVENTION

1. Field of the Invention

This invention relates generally to the field of devices for data entry into a computer system, and relates more particularly to an apparatus and method for inputting data based on an object within a specified field into a computer and using inputted data to move a virtual object on a display screen.

2. Description of the Relevant Art

Typically, devices such as keyboards, joy sticks, mice, and light pens are used to input data into a computer. A function of these input devices is to position a virtual object such as a cursor on the display screen of a computer. Once the cursor is positioned at a desired location, the computer typically will be instructed to perform an operation. The processes of positioning the cursor and selecting the operation are discrete operations, since separate motions are required to perform each operation. With a mouse, for example, cursor positioning is accomplished by moving a mouse along the surface, while selection of the operation is accomplished by pushing keys located either on the mouse or on a separate keyboard. Mastering the operation of such input devices is often difficult because the hand movements required to operate the devices do not correspond to the visual feedback presented by the display screen of the computer. Furthermore, the operator's hand must be removed from the keyboard positioned on the mouse and then returned to the keyboard.

Glove input devices also have been used to supply data to computers. U.S. patent application Ser. No. 317,107 by Thomas G. Zimmerman et al., and entitled "Computer Data Entry and Manipulation Apparatus and Method", describes one such glove input device. This glove input device allows the user to control the movement of a virtual object on a video display screen and perform an operation using a single movement of the operator's hand.

A problem with such a system is that it requires a wire connection between the object and the computer system to sense the operator's hand movement. The wire adds to the expense of the manufacture of the system, and may become twisted or broken affecting operation.

Another problem with prior glove input systems is the added expense necessary for the object sensing field. The glove system disclosed in U.S. patent application Ser. No. 317,107 uses a low frequency magnetic field such as the 3SPACE™ system available from Polhemus Inc. of Colchester, Vt. to sense object movement. The wireless input control system in U.S. Pat. No. 4,654,648 uses an acoustical field to sense object movement. The creation of these sensing fields increases manufacturing costs of the computer system.

Tracking systems use software to generate the virtual object on the computer screen. The positioning of the virtual object typically uses triangulation to determine object position on the display screen. Using triangulation to determine object position necessitates knowledge of the distance of the object from the receiver, and computation can be complicated by determination of the squares or square root of the object to receiver distance. The present invention uses a simple averaging method of receiver signal strength to determine virtual object positioning on the computer display terminal; no distance calculation is required. Using this simpler averaging method increases computation speed and decreases complexity.

SUMMARY OF THE INVENTION

The present invention provides an inexpensive method and apparatus for transmitting data about an object within a defined field and using transmitted data to generate a virtual object on the display screen of a computer. In one embodiment of the present invention the object used to transmit input data is a wireless glove assembly. The tracking and display system uses a radio frequency signal to track the glove positioning, instead of a more expensive low frequency magnetic or acoustical field. Also, a single averaging method is used to determine the object position instead of the more complex triangulation method.

The glove assembly supports a transmitting device which transmits data bursts of gesture information at a radio frequency to four stationary receivers. The received signal is converted to a digital signal and input to a microprocessor control unit. The software used in the microprocessor control unit uses the inputted data to generate a virtual object on the computer display screen. The position of the virtual object is calculated based on the strength of the signal received. The movement of the virtual object on the computer display screen is in the same direction as and is proportional to the object movement.

BRIEF DESCRIPTION OF THE DRAWINGS

FIG. 5 is a source code listing of the software employed in a particular embodiment of the present invention which is used to sense the virtual object and translate the positional movements on a computer display terminal.

BRIEF DESCRIPTION OF THE APPENDIX

Appendix 1 is a text description of alternative embodiments of the present invention.

DETAILED DESCRIPTION OF THE PREFERRED EMBODIMENTS

FIGS. 1–5 of the drawings depict various preferred embodiments of the present invention for purposes of illustration only. One skilled in the art will recognize from the following discussion that alternative embodiments of the structures and methods illustrated herein may be employed without departing from the invention.

Figure 1:
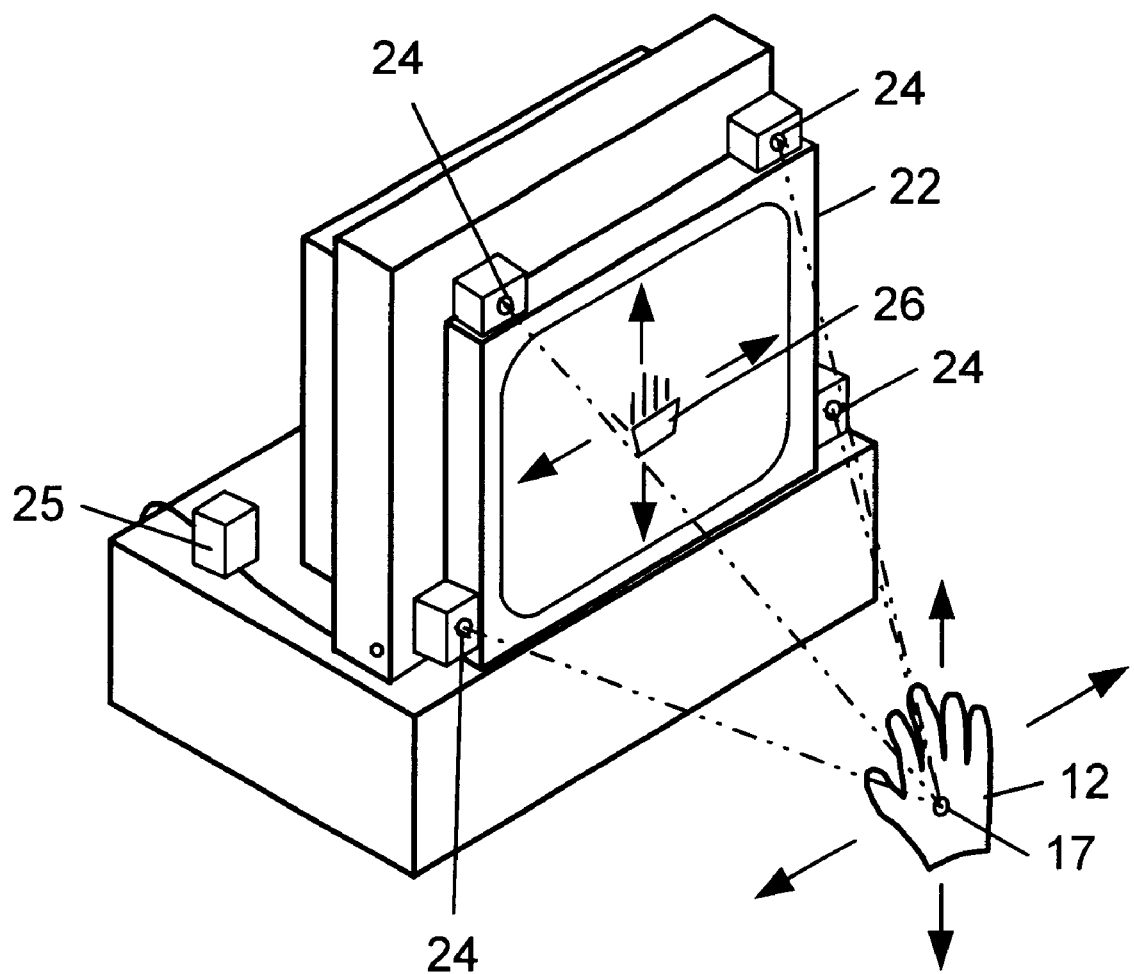
FIG. 1 is a perspective view of a particular embodiment of a wireless radio frequency tracking and display system invention.

In FIG. 1, a preferred embodiment of the present invention is illustrated in its intended mode of use, namely as a tracking system for an object within a defined space. The tracking system comprises a transmitting device 17, receiving devices 24, and an interface unit 25. The object in the preferred embodiment is a glove assembly 12 which supports a transmitting device 17. The transmitting device 17 transmits data bursts containing gesture information at a radio frequency to four stationary receivers 24. The received signal is converted to a digital signal in the interface 25 and input to a microprocessor control unit. The software used in the microprocessor control unit uses the inputted data to generate a virtual object 26 on the computer display screen.

In operation, the glove assembly is worn on the hand of an operator, and is used to position a cursor or other representative of the glove on the display screen of the computer. The glove assembly 12 typically consists of an inner (not shown) and outer glove. In one embodiment of the present invention, the transmitter is affixed to the inner glove. The inner glove also supports five sensors to detect the opening or closing of the finger positions. These sensors may be metal contacts affixed to the fingers and pals of the inner glove. When the switches of the glove are open, i.e. the sensors do not contact each other, the transmitting device sends out a high digital signal. When the finger positions are closed, i.e. the sensors are in contact with each other, a low digital signal is transmitted.

Figure 2:
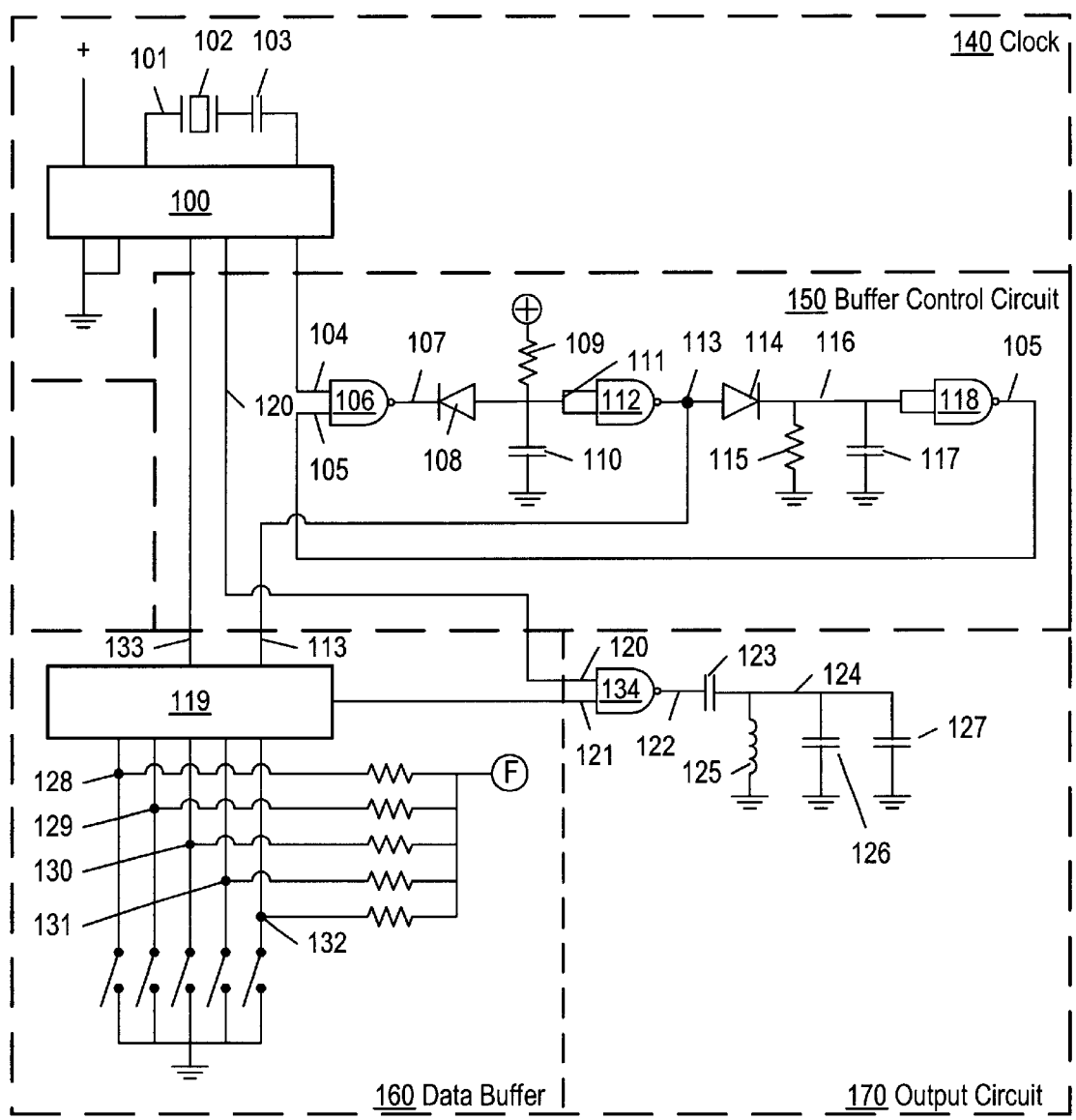
FIG. 2 is a circuit schematic of the circuitry in a particular embodiment used to transmit a radio frequency signal from the object to the receivers according to the present invention.

Data is transmitted to the receivers in radio frequency bursts of approximately 9.5 milliseconds in duration by the transmitter circuitry illustrated in FIG. 2. FIG. 2 is a circuit schematic of one embodiment of the circuitry used to transmit a radio frequency signal from the glove to the receivers. The transmitter 17 comprises a clock 140, a buffer control section 150, a data buffer 160, and an output circuit 170.

The clock 140 comprises a chip 100 which combines an oscillator and binary down counter function, such as the National Semiconductor CD4060. The chip 100 is coupled to a crystal 102 and a capacitor 103. In operation, the clock 140 generates a square wave on lines 104, 120, and 133. The chip 100 outputs an 884 Hz signal on line 133, a 218 Hz signal on line 104, and a 223,750 Hz signal on line 120. The 223,750 Hz square wave generated on line 120 serves as the carrier frequency for the radio frequency data burst.

The buffer control circuitry 150 controls the timing of the data transmission of the transmitter circuit 17. The buffer control circuit 150 comprises a NAND gate 106 which is coupled to the cathode of a diode 108. The anode of diode 108 is coupled to a resistor 109, a capacitor 110, and the input to NAND gate 112. The output of the NAND gate 112 is line 113 which is coupled to data buffer section 160. The output of NAND gate 113 is similarly coupled to the anode of diode 114. The cathode of diode 114 is coupled to the resistor 115 and the capacitor 117, and the input to NAND gate 118. The output of NAND gate 118 is fed back to the input of NAND gate 106.

The NAND gates 106, 112, and 118 exhibit characteristics similar to that of the National Semiconductor CD4093. The CD4093 has a logic threshold which is approximately 50% of the line supply voltage. This logic threshold value allows us to generate a sine wave out of the square wave generated in the clock 140, in conjunction with the choke coil 125 and capacitors 126 and 127 in the output circuit 170.

In operation, the buffer control circuitry 150 controls the timing of the data transmission of the circuit by controlling when data is sent into the data buffer. In the steady state, line 104 is low and no data is transmitted. When line 104 is low, a high data signal is output from the NAND gate 106. A high output from NAND gate 106 reverse biases diode 108 allowing 120K resistor 109 to charge the 0.01 $\mu$F capacitor 110 resulting in a high data input value to NAND gate 112 and a low data output signal on line 113.

Line 113 connects the buffer control circuit 150 to the data buffer section 160 and controls the input of data to the shift register 119. When line 113 is low, no data is input to the shift register 119 and therefore no data is transmitted. A high data signal on line 105, does not change the steady state since both values must be high to change the output of NAND gate 106. In order to transmit data, line 104 must be high. This, in conjunction with the high data signal on line 105, results in a low data output on line 107 which causes 0.01 $\mu$F capacitor 110 to discharge resulting in a high data signal on line 113.

The triggering to load transmit data into the shift register 119 occurs at about 218 Hz which is too fast a rate for the shift register 119 to shift out data. The buffer control circuitry 150 works by causing a delay in the transmission of the data signal. This delay is created by the RC load comprised of a 33K resistor 115 and the 1 $\mu$F capacitor 117 on line 116.

Data buffer 160 comprises a shift register 119, a series of resistors 134–138, and a series of switches 141 through 145. Shift register 119 is an 8-bit parallel in, serial out shift register. Line 113 is connected to pin 9 of shift register 119 and controls the input of data into the shift register. A high data signal on line 113 causes the shift register 119 to parallel load the data on lines 128–132 into the shift register 119.

The first two bits of the 8-bit shift register are not used for transmittal of data, but are held high so that the receivers have time to stabilize and accurate positional data is received. The next five bits of the shift register 119 are used for finger data. The data on lines 141–145 indicate whether the finger position is open or closed. If the finger position is open, a high data signal is sent to the shift register. If the finger position is closed, a low data signal is input into the shift register. The eighth bit of the shift register 119 is unused, and may be used to indicate, for example, whether the data signal is from a left or right glove, or whether the glove is in front of the receivers or in back of the receivers.

The data output circuitry 170 is comprised of a NAND gate 134, which is coupled to capacitor 123 which is coupled to choke coil 125, capacitor 126, and capacitor 127 in parallel. The output from shift register 119 and the 223,754 Hz signal from clock-circuitry 140 are input into NAND gate 134 so that line 122 modulates the carrier frequency. The output from line 122 is input into the antiresonance circuit which is slop tuned to 223,750 Hz. The 100 $\mu$H coil 125 acts as a cylindrically direction antenna to transmit data to the receivers.

Figure 3:
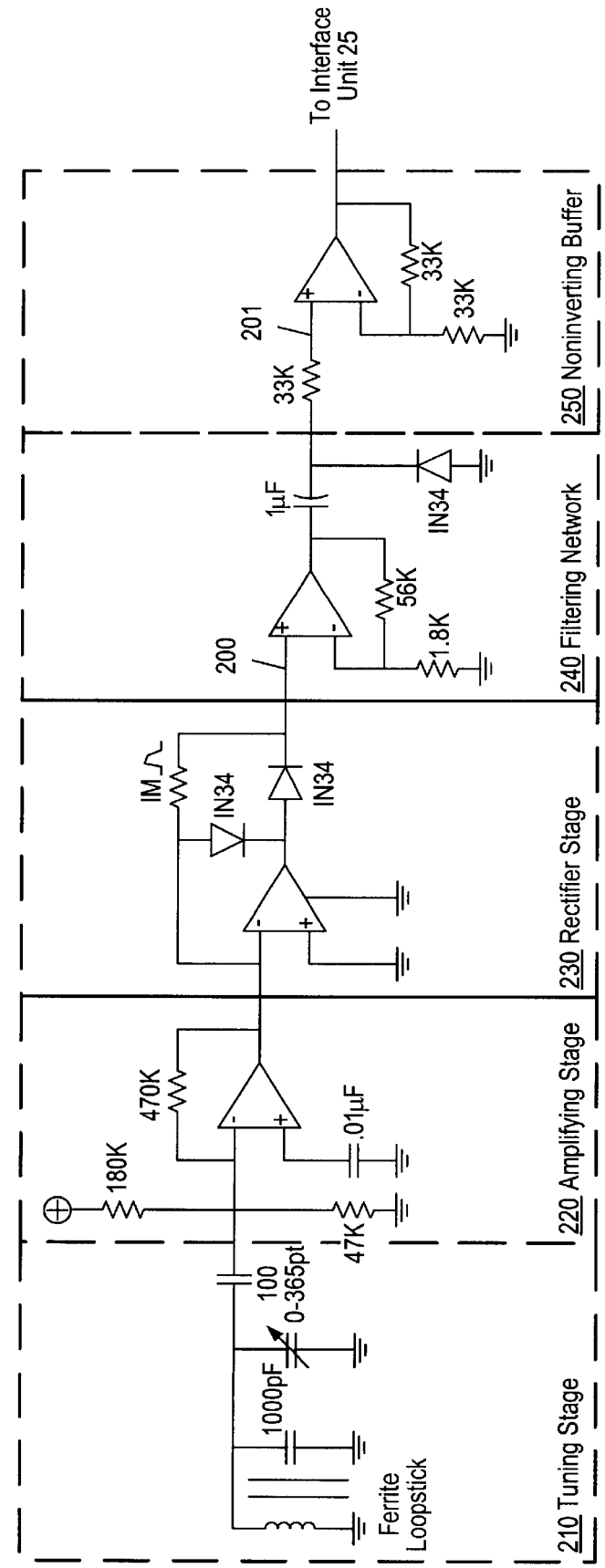
FIG. 3 is a circuit schematic of a particular embodiment the radio frequency receivers according to the present invention.

FIG. 3 is a circuit schematic of the receivers used in the tracking system. The receiver is comprised of a tuning stage 210, an amplifying stage 220, a rectifier stage 230, a filtering stage 240, and a non-inverting buffer 250.

The ferrite loop stick and two capacitors, together, form an antiresonance circuit which tunes the receiver to the same frequency as a transmitted signal in the glove. The transmitted signal is input into the first amplifying stage 220 and then rectified in the second stage 230 which acts as a half wave rectifier. The result at node 200 is an amplified unipolar signal that has been rectified. The amplified signal is then sent through a third stage 240 which acts as a filtering network to filter out the radio frequency signal and restores the DC level. The resulting signal at node 201 is the originally transmitted signal without the addition of the radio frequency signal and restored the DC level. The signal at node 201 is then sent through the fourth stage 250 which is a two-to-one non-inverting buffer. This resulting signal is sent to the interface unit shown in FIG. 4.

Figure 4A:
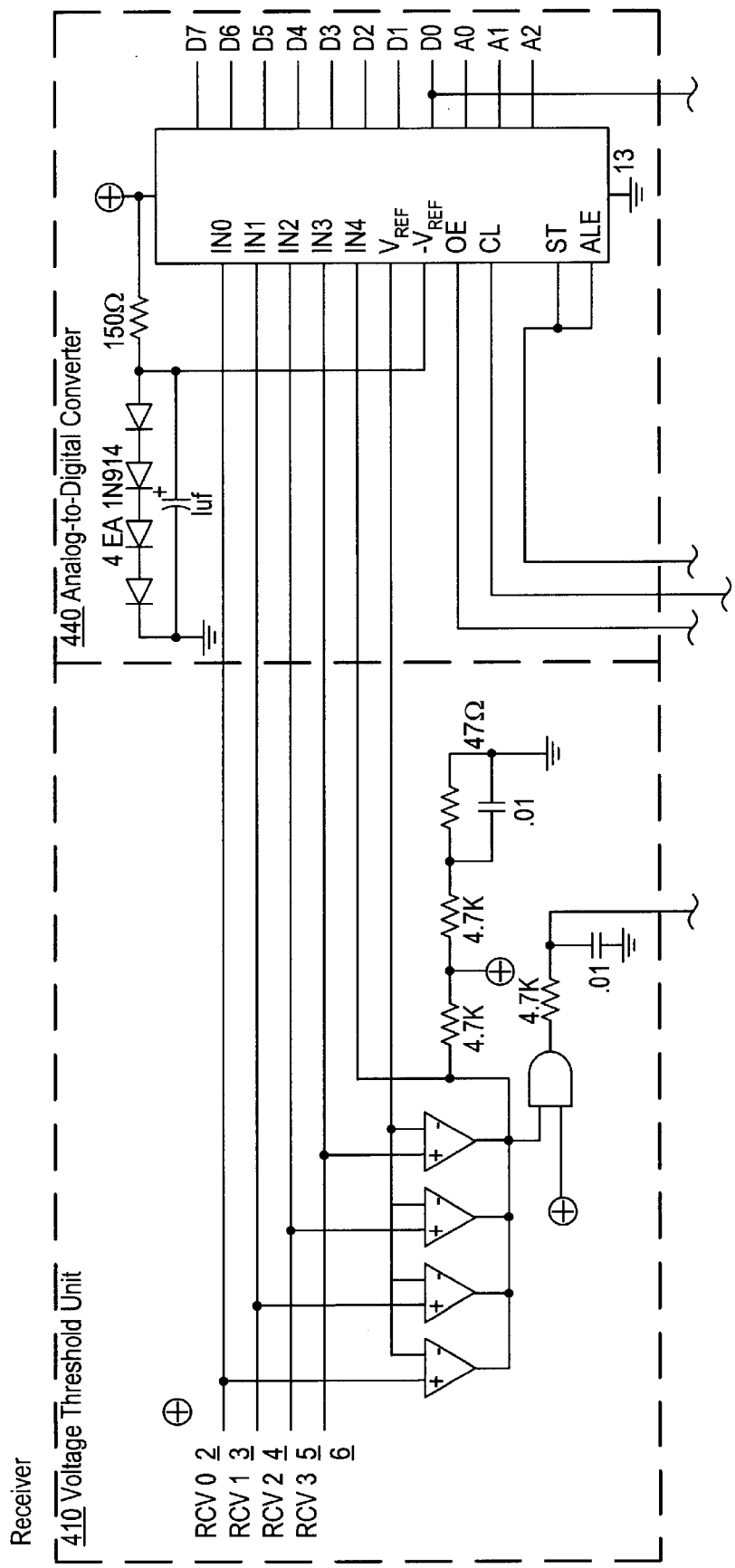
FIG. 4 is a circuit schematic of a particular embodiment of the interface used between the receivers and the microprocessor control unit in the present invention.
Figure 4B:
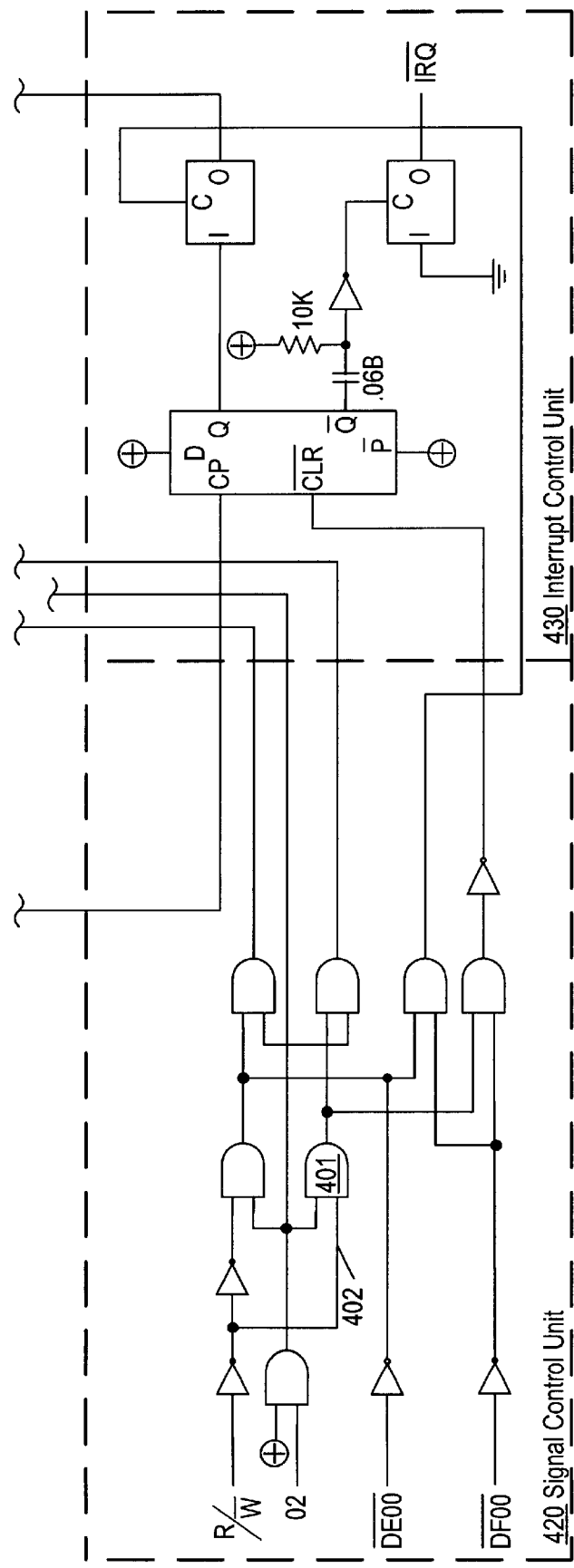

FIG. 4 is a circuit schematic of the interface 25 between the receivers 24 and the computer. The interface 25 comprises a voltage threshold unit 410, a signal control unit 420, an interrupt control unit 430 and an analog-to digital converter 440.

The receiver signals are input to the analog-to-digital converter 440 and the voltage threshold unit 410. The voltage threshold unit 410 comprises a series of comparators coupled to an RC network. The comparators have their negative inputs tied to the negative reference voltage. The output of the comparators are open collector and are wired together so that an interrupt is triggered when the threshold is exceeded by any of the receivers.

The negative reference leads of the comparators are tied to a network of resistors and capacitors in order to prevent false triggering. The RC network keeps both the analog-to-digital converter and the comparators at the same voltage level, which prevents false triggering. The NAND gate in series with the 4.7K resistor and 0.01 $\mu$F capacitor provides additional protection against false triggering by preventing terrestrial noise from triggering a false conversion process.

The signal control unit 420 controls the conversion of the analog signal to a digital signal, and the output of the converted signal to the microprocessor unit. In order to read a channel from the analog-to-digital converter, the accumulator must be loaded and then written to the zero channel (DE00). To perform a write operation, the data input signal to NAND gate 401 on line 402 must be high. A high signal on line 402 results in a high data signal to pins 22 and 6 of the analog-to-digital converter, enabling the address latch function and starting the conversion process for whatever address is on lines A0 through A1. The microprocessor must then wait 100 $\mu$sec before being able to read data output on the data bus D0 through D7.

The interrupt control unit 430 generates an interrupt signal on line IRQ4 to signal to the microprocessor that a data burst is ready to be read. The software, in an interrupt handling subroutine, clears the interrupt and stores the receiver data. The receiver data is used in determining gestures and also in the calculation of the position of a virtual object on the display screen.

FIG. 5 is a source code listing of the software currently used to determine the gesture and position of the object within the radio frequency field. In determining the position of the virtual object on the computer display terminal, the current code used does not use triangulation. Data is read from the four receivers and we have a known center of the screen. The code basically adds and subtracts the receiver values using combinations of two receivers at a time to get positional data. This addition and subtraction approximates the position of the virtual object by comparing the strength of the signals from two receiver values. The virtual object moves towards the receiver which has the higher value.

In determining signal strength, the receiver values are first scaled before calculations are performed. The receiver values are scaled such that the highest receiver value is 255 which is the maximum output of the analog-to-digital converter on the interface. After the receiver values are read, the x, y, and z positions of the virtual object are calculated. The display screen is divided into a right and left side, and a top and bottom side. Receiver 0 is affixed to the bottom left corner of the prototype mounting. Receiver 1 is affixed to the top left corner of the mounting. Receivers 2 and 3 are on the right side of the prototype mounting; receiver 2 being in the top corner and receiver 3 being in the bottom corner.

In calculating the position of the virtual object, the display screen uses an averaging method instead of a triangulation method used in other tracking systems. This averaging method decreases computation time and simplifies the calculation of the position. The software first determines averages of the right and left values. The values of receivers 2 and 3 are added together and averaged by dividing the sum by 2. The values of receivers 1 and 0 are added together and divided by 2 to determine the average of those two values. The software then determines if the object is on the right or left side of the screen. To determine the X position, the center screen value is added to the right side value or the left-hand side value is subtracted from the center value.

A similar calculation is performed for determining the y position value. In determining the y position, the averages of the lower and upper receivers are calculated. The y position is then calculated, based on whether the object is in the upper or lower portion of the field. If the object is in the upper portion of the field, the y position is determined by subtracting the upper receiver value from the center screen value. If the object is in the lower portion of the screen, the y position is calculated by adding the lower receiver value to the center screen value.

The z value is calculated by averaging all four receiver values. In the code listing in FIG. 5, first the two left hand receiver values (receiver 0 and receiver 1) are added together and divided by two. Next the right hand receiver values (receiver 2 and receiver 3) are added together and divided by two. Finally, the two averages are added together and divided by two to give the z virtual object position.

The data burst includes gesture data. The software routine has a gesture recognition routine. The gesture recognition routine compares the current gesture with the old gesture. If there is a new gesture the gesture recognition routine compares it to the gestures stored in a gesture table. The routine continue searching through the table until it finds a gesture that matches the current gesture. This gesture table increases user flexibility, since it may easily be enlarged to include new gestures for new input values.

The foregoing is a description of the preferred embodiment of the invention. It should be understood that specific details, such as component types, have been provided to explain the construction of the invention. For example, in FIG. 4 the series of NAND gates and inverters in the signal control unit could be replaced with an address decoder chip. Furthermore, an object other than a glove may be used to transmit operational data. For example, a transmitting device could be affixed to a headset instead of a glove. A handicapped person could use a puff and blow mechanism to transmit operation data. For example, a light puff of air could represent the operation of moving a wheelchair to the right. The scope of the invention may be determined from the appended claims.

What is claimed is:

1. A radio frequency tracking system for tracking the movement of an object not in direct physical contact with the system comprising:

a transmitting means affixed on said object;

a receiving means for detecting the transmitted signal; and an interface means for coupling signals from said receiving means to the computer; and wherein the receiving means comprises a plurality of receivers;

further comprising a display means for displaying a virtual object on a screen and a means for controlling said virtual object on said screen;

wherein movement of said virtual object is dependent on the strength of the receiver signals; and wherein the z position value of said virtual object is a function of the average value of all said receiver signals.

2. A radio frequency tracking system as in claim 1 wherein said object is a glove.

3. A radio frequency tracking system as in claim 2 wherein the display means is adapted to display a representation of a hand which mirrors the position of fingers of the user's hand.

4. A radio frequency tracking system as in claim 1 wherein the movement of said virtual object on said screen is proportional and in the same direction as said object movement.

5. A radio frequency tracking system as in claim 1 wherein the movement of said virtual object in the x direction is proportional to the average value of the two closest receiver values to said object along the x axis.

6. A radio frequency tracking system as in claim 1 wherein the movement of said virtual object in the y direction is proportional to the average value of the two closest receiver values to said object along the y axis.

7. A system according to claim 1, further comprising:

a subsystem configured to generate a virtual object on a screen using an estimated position of said object determined by the position calculating unit.

8. A method for tracking the movement of an object comprising:

transmitting a data burst from an object;

detecting the transmitted signal from said object; and coupling the detected signal to a computer;

wherein the signal is detected by a plurality of receivers;

further comprising displaying a virtual object on a screen and controlling the movement of said virtual object on said screen;

wherein movement of said virtual object is dependent on the strength of the receiver signals; and wherein the z position value of said virtual object is a function of the average value of all said receiver signals.

9. A method for tracking the movement of an object as in claim 8 wherein the transmitted signal contains information about said object.

10. A method for tracking the movement of an object as in claim 8 wherein said object is a glove.

11. A method for tracking the movement of an object as in claim 8 further comprising a display means wherein the display means is adapted to display a representation of a hand which mirrors the position of fingers of the user's hand.

12. A method for tracking the movement of an object as in claim 8 wherein the movement of said virtual object on said screen is proportional and in the same direction as said object movement.

13. A method for tracking the movement of an object as in claim 8 wherein the movement of said virtual object in the x direction is proportional to the average value of the two closest receiver value along the x axis.

14. A method for tracking the movement of an object as in claim 8 wherein the movement of said virtual object in the y direction is proportional to the average value of the two closest receiver values along the y axis.

15. A system for estimating a position of an object, comprising:

a transmitter, disposed on said object, which transmits signals:

a plurality of receivers which receive the signals transmitted by the transmitter; and a position calculating unit configured to estimate a position of said object by averaging strengths of the signals received by at least some of said plurality of receivers.

16. A system according to claim 15, wherein:

strengths of signals from a first plurality of receivers are used to estimate a position along an x axis and strengths of signals from a second plurality of receivers are used to estimate a position along a y axis.

17. A system according to claim 15, wherein a position along a z axis is estimated by averaging strengths of signals received by each of said plurality of receivers.

18. A system according to claim 15, wherein said transmitter is a radio frequency transmitter.

19. A system according to claim 15, further comprising:

a display for displaying the estimated position of said object.

20. A system according to claim 15, wherein:

said object is a wireless glove assembly.

* * * * *